United States Patent
Lopes et al.

(10) Patent No.: US 10,327,160 B2
(45) Date of Patent: Jun. 18, 2019

(54) SYSTEMS AND METHODS FOR MANAGING NETWORK CONTROLLERS AND THEIR NETWORK INTERACTIONS IN A NETWORK OF MOVING THINGS, FOR EXAMPLE INCLUDING A NETWORK OF AUTONOMOUS VEHICLES

(71) Applicant: Veniam, Inc., Mountain View, CA (US)

(72) Inventors: Diogo Lopes, Esgueira (PT); Rui Costa, S. João das Lampas (PT)

(73) Assignee: Veniam, Inc., Mountain View, CA (US)

( * ) Notice: Subject to any disclaimer, the term of this patent is extended or adjusted under 35 U.S.C. 154(b) by 250 days.

(21) Appl. No.: 15/352,979

(22) Filed: Nov. 16, 2016

(65) Prior Publication Data

US 2017/0195897 A1    Jul. 6, 2017

Related U.S. Application Data

(60) Provisional application No. 62/273,715, filed on Dec. 31, 2015.

(51) Int. Cl.
| | | |
|---|---|---|
| H04L 29/08 | (2006.01) | |
| H04L 29/14 | (2006.01) | |
| H04W 24/02 | (2009.01) | |
| H04W 24/04 | (2009.01) | |

(52) U.S. Cl.
CPC ............ H04W 24/02 (2013.01); H04L 67/10 (2013.01); H04L 67/12 (2013.01); H04L 67/125 (2013.01); H04L 69/40 (2013.01); H04W 24/04 (2013.01)

(58) Field of Classification Search
None
See application file for complete search history.

(56) References Cited

U.S. PATENT DOCUMENTS

| | | | |
|---|---|---|---|
| 2008/0112362 A1* | 5/2008 | Korus | H04L 29/12811 |
| | | | 370/331 |
| 2017/0086229 A1* | 3/2017 | Lopes | H04W 76/10 |
| 2017/0132853 A1* | 5/2017 | Matos | G07C 5/008 |
| 2017/0149901 A1* | 5/2017 | Condeixa | H04L 67/18 |
| 2017/0171834 A1* | 6/2017 | Neves | H04L 67/12 |
| 2017/0181201 A1* | 6/2017 | Lopes | H04W 76/10 |
| 2017/0195897 A1* | 7/2017 | Lopes | H04W 24/02 |
| 2017/0324817 A1* | 11/2017 | Oliveira | H04L 67/142 |
| 2018/0006905 A1* | 1/2018 | Correia e Costa | ........... |
| | | | H04L 41/5067 |
| 2018/0211534 A1* | 7/2018 | de Moura | G06Q 50/30 |
| 2018/0316764 A1* | 11/2018 | Ferreira Gomes | H04L 67/125 |
| 2018/0343587 A1* | 11/2018 | Condeixa | H04W 28/26 |

* cited by examiner

*Primary Examiner* — Brian Whipple
(74) *Attorney, Agent, or Firm* — McAndrews, Held & Malloy, Ltd.

(57) ABSTRACT

Systems and methods for managing network controllers (or mobile controllers) and their network interactions in a network of moving things. As non-limiting examples, various aspects of this disclosure provide systems and methods for assigning and/or adapting the assignment of network controllers to mobile access points (e.g., of autonomous vehicles, manually locally controlled vehicles, remotely controlled vehicles, etc.).

21 Claims, 14 Drawing Sheets

SYSTEMS AND METHODS FOR MANAGING NETWORK CONTROLLERS AND THEIR NETWORK INTERACTIONS IN A NETWORK OF MOVING THINGS, FOR EXAMPLE INCLUDING A NETWORK OF AUTONOMOUS VEHICLES

CROSS-REFERENCE TO RELATED APPLICATIONS/INCORPORATION BY REFERENCE

This patent application makes reference to, claims priority to, and claims benefit from U.S. Provisional Patent Application Ser. No. 62/273,715, filed on Dec. 13, 2015, and titled "Systems and Methods for Managing Mobility Controllers and Their Network Interactions in a Network of Moving Things," which is hereby incorporated herein by reference in its entirety for all purposes.

This application is related to U.S. Provisional Application No. 62/260,749, filed on Nov. 30, 2015, and titled "Systems and Methods for Improving Fixed Access Point Coverage in a Network of Moving Things," the entire contents of which are hereby incorporated herein by reference for all purposes. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
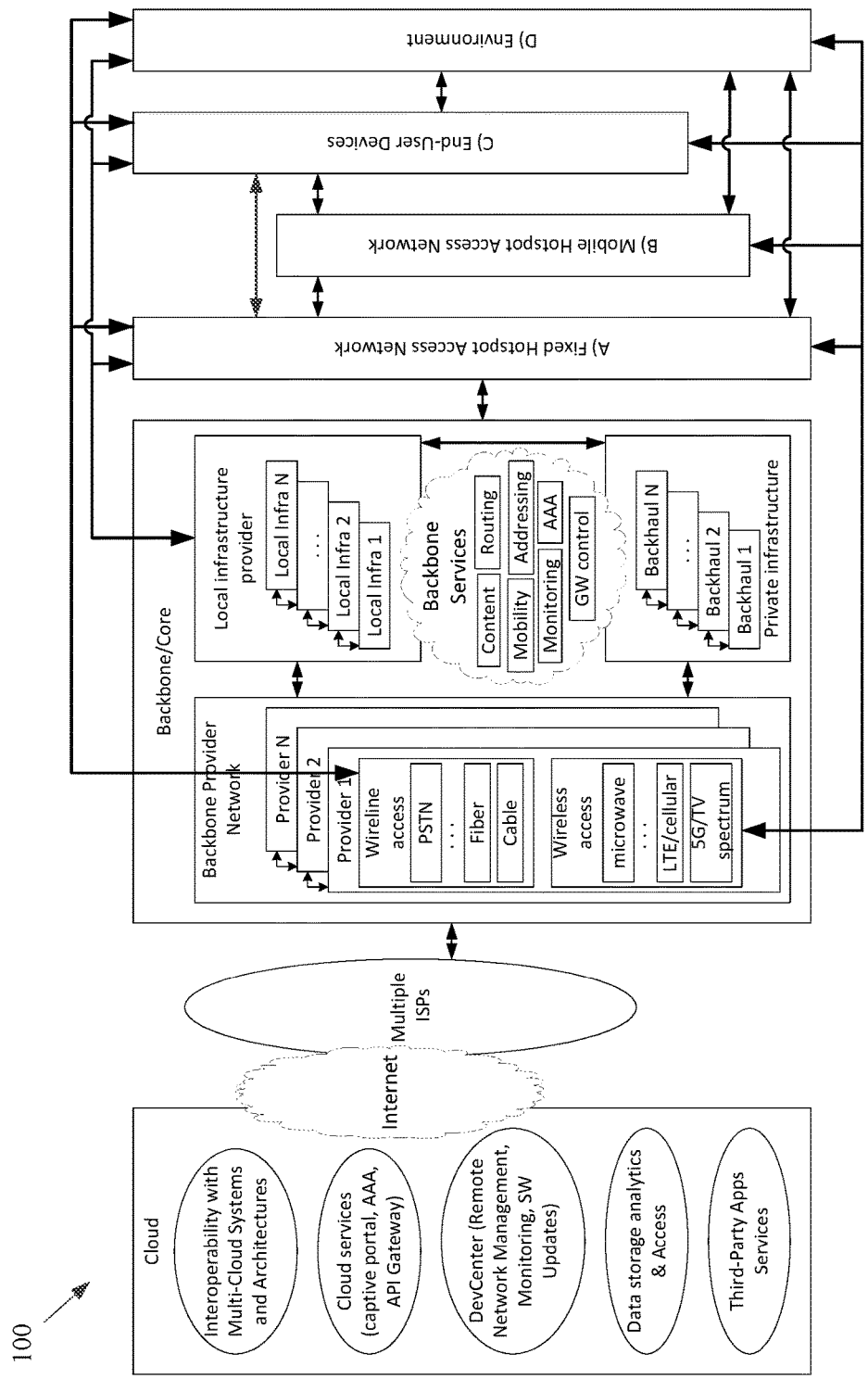
FIG. 1 shows a block diagram of a communication network, in accordance with various aspects of this disclosure.

Various aspects of this disclosure provide systems and methods for managing network controllers (or mobile controllers) and their network interactions in a network of moving things. As non-limiting examples, various aspects of this disclosure provide systems and methods for assigning and/or adapting the assignment of network controllers to mobile access points (e.g., of autonomous vehicles, manually locally controlled vehicles, remotely controlled vehicles, etc.).

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, networks, and/or network components 200, 300, 400, 500-570, 600, 700, 800, 900, 1000, 1100, and 1200, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
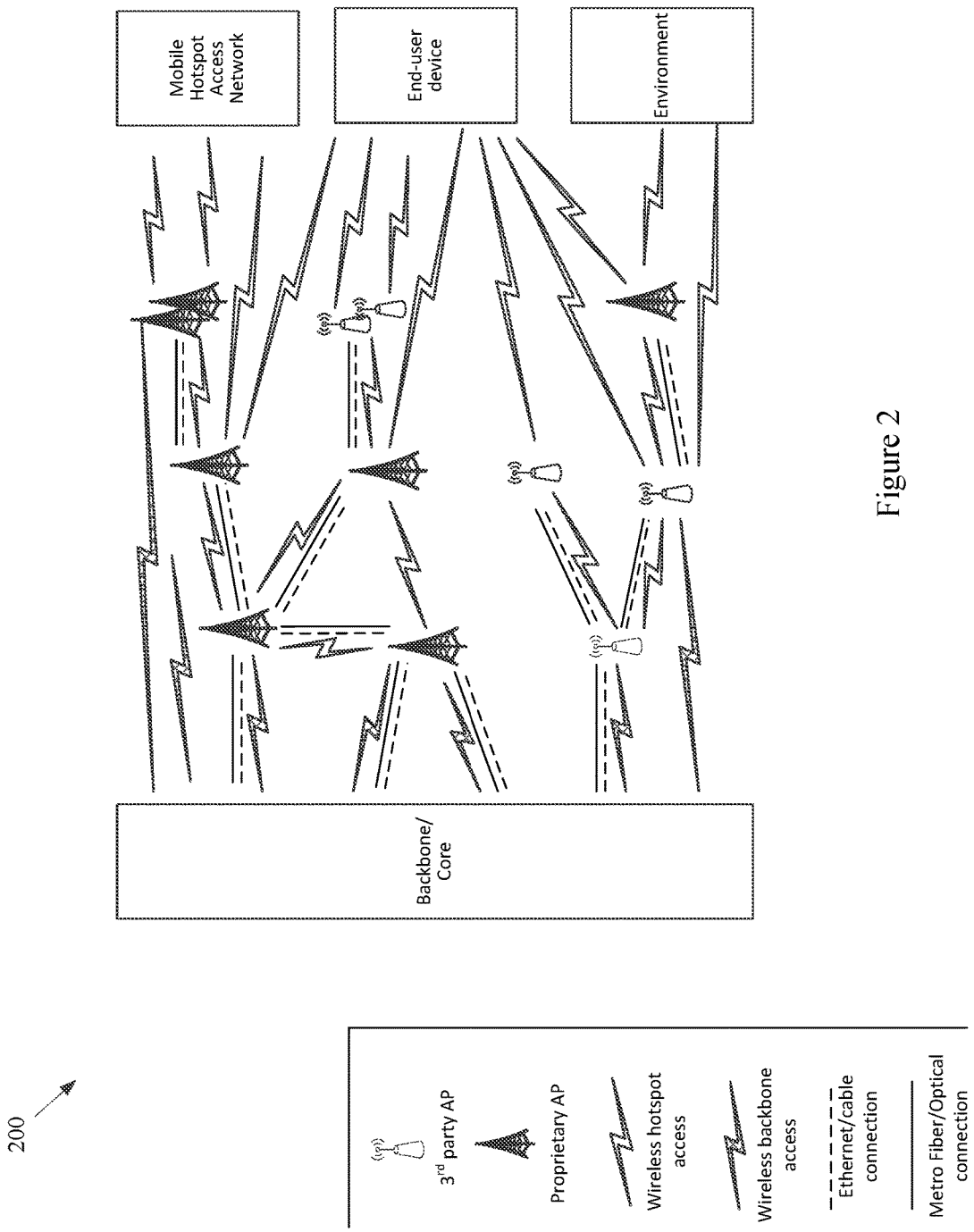
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, networks, and/or network components 100, 300, 400, 500-570, 600, 700, 800, 900, 1000, 1100, and 1200, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
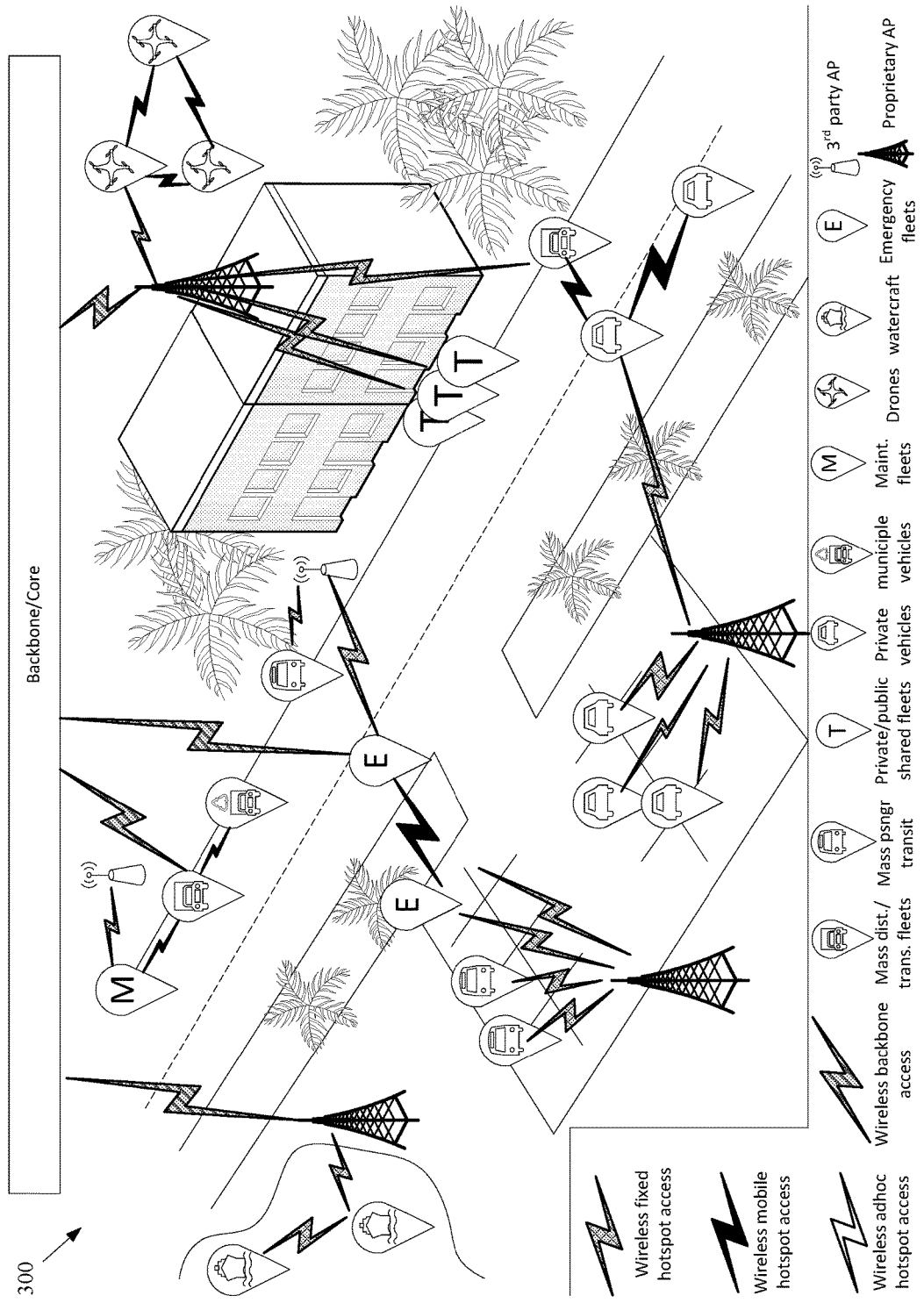
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, networks, and/or network components 100, 200, 400, 500-570, 600, 700, 800, 900, 1000, 1100, and 1200, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
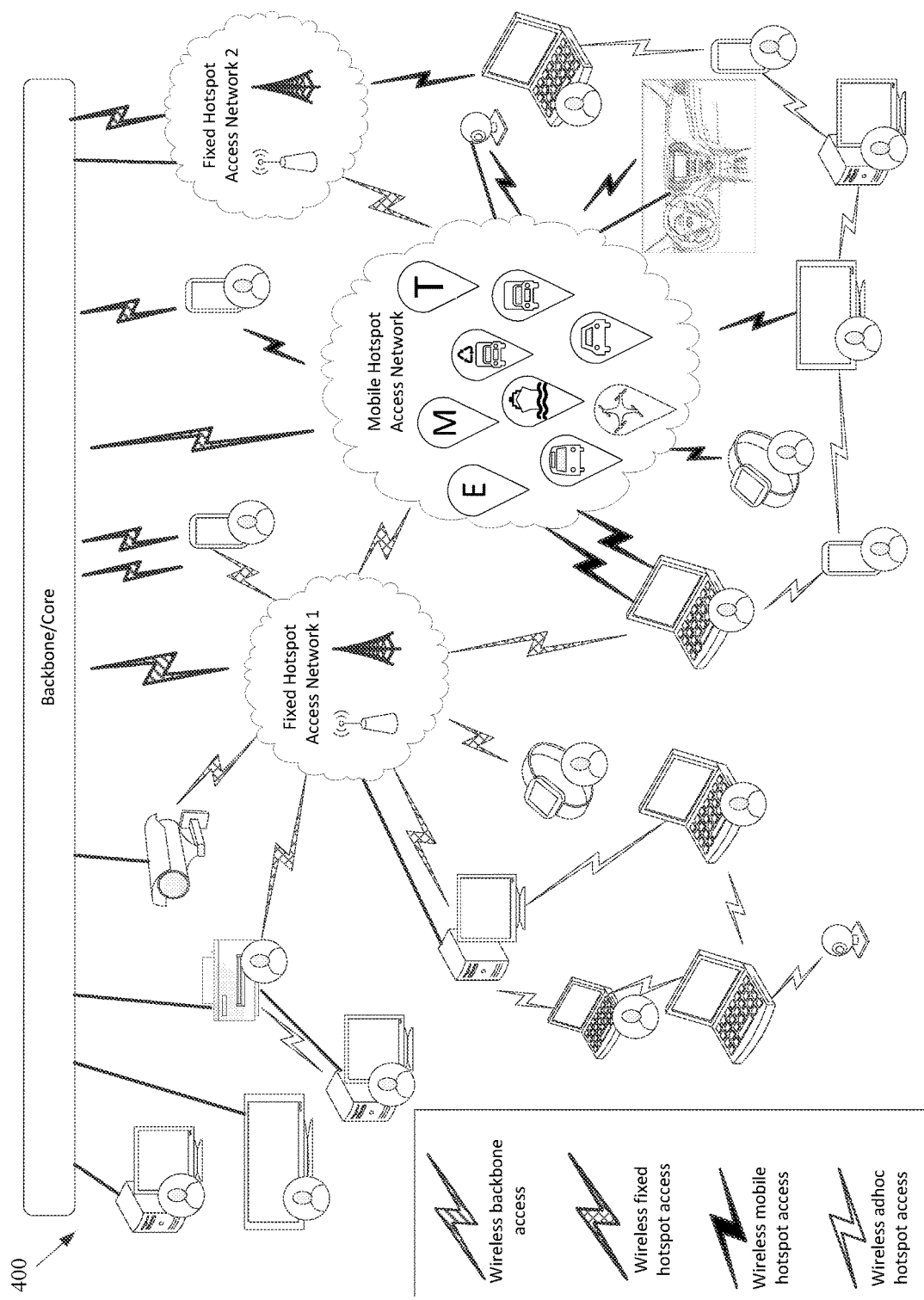
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, networks, and/or network components 100, 200, 300, 500-570, 600, 700, 800, 900, 1000, 1100, and 1200, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
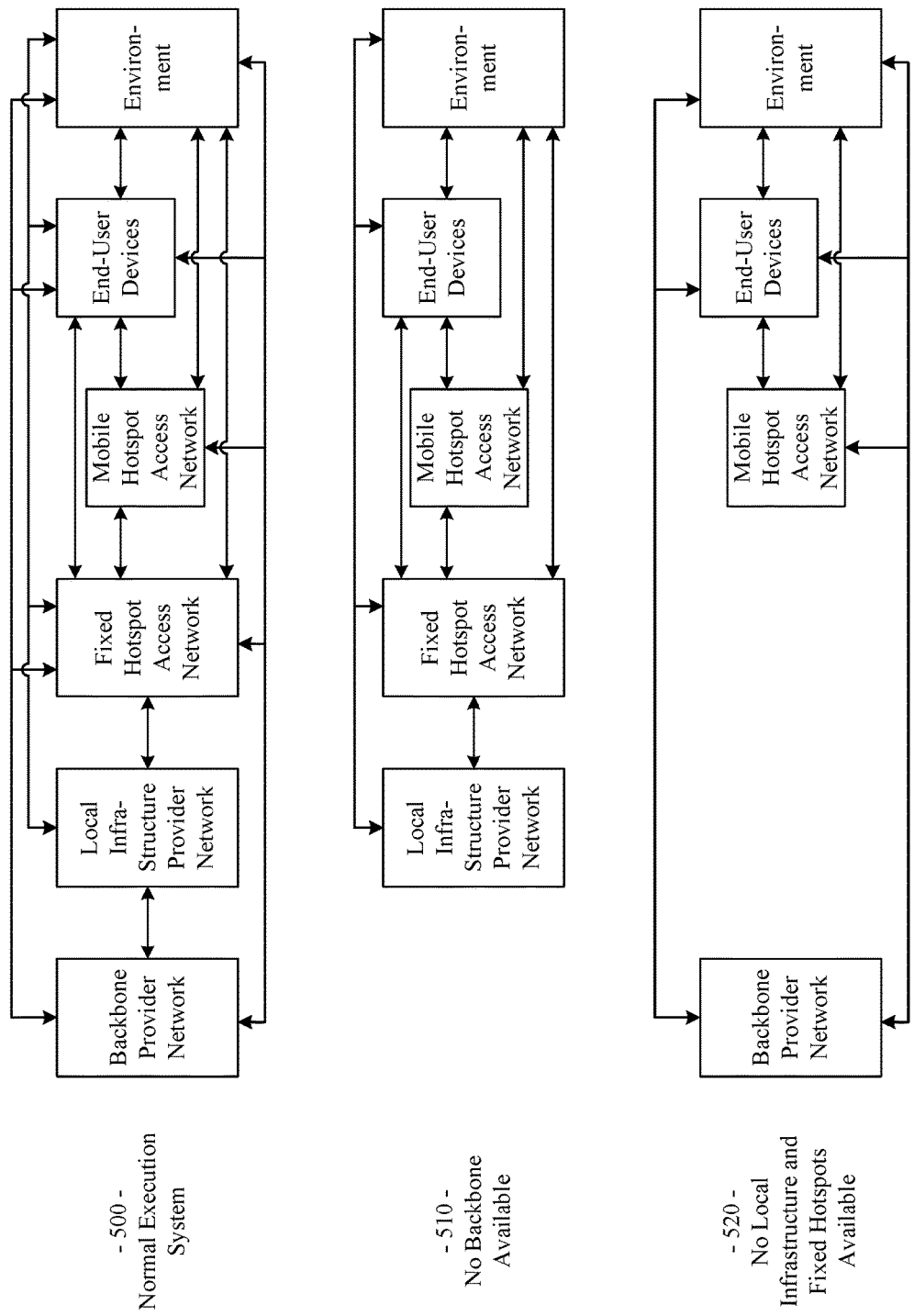
FIGS. 5A-5C show a plurality of network configurations illustrating the flexibility and/or and resiliency of a communication network, in accordance with various aspects of this disclosure.
Figure 5B:
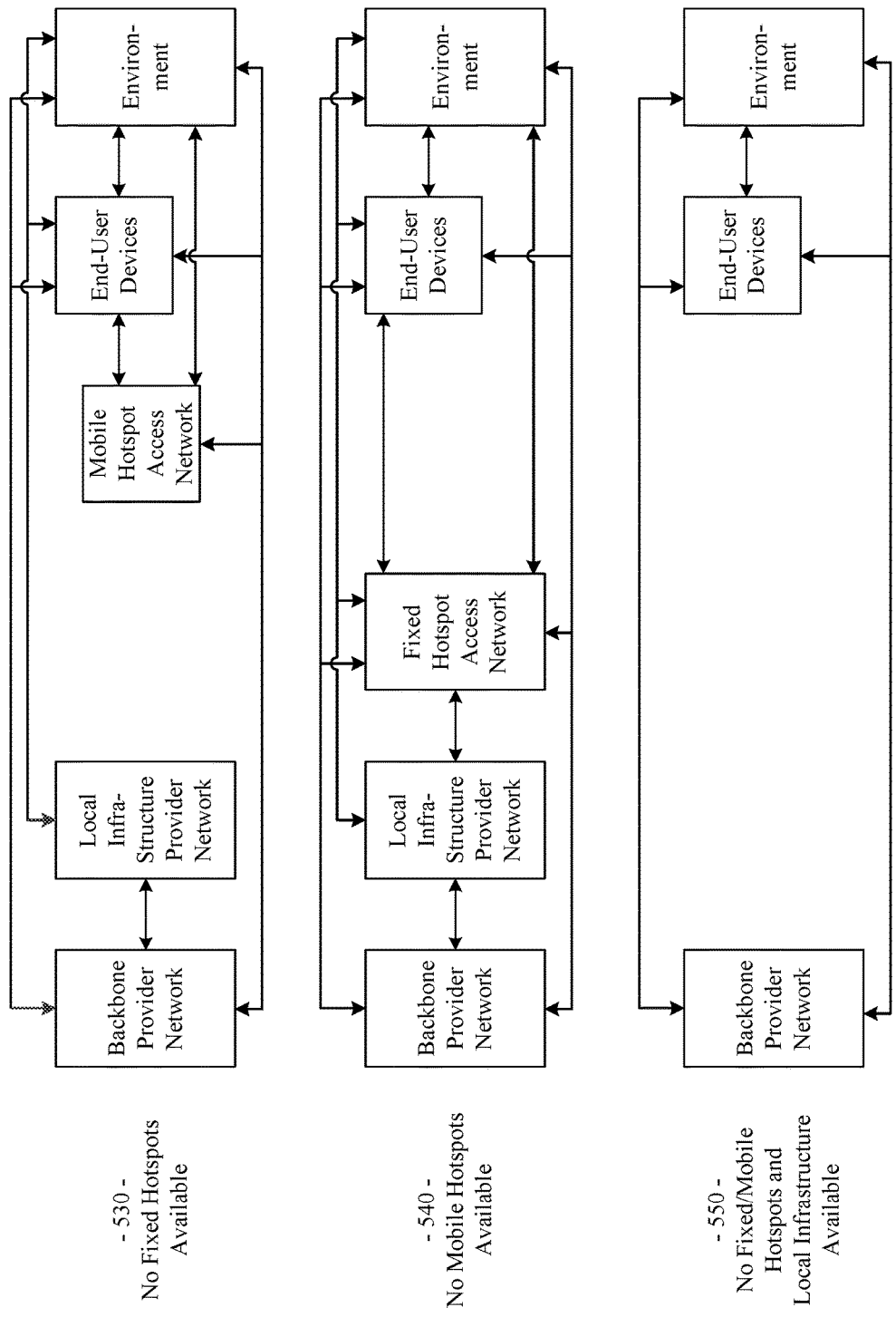
Figure 5C:
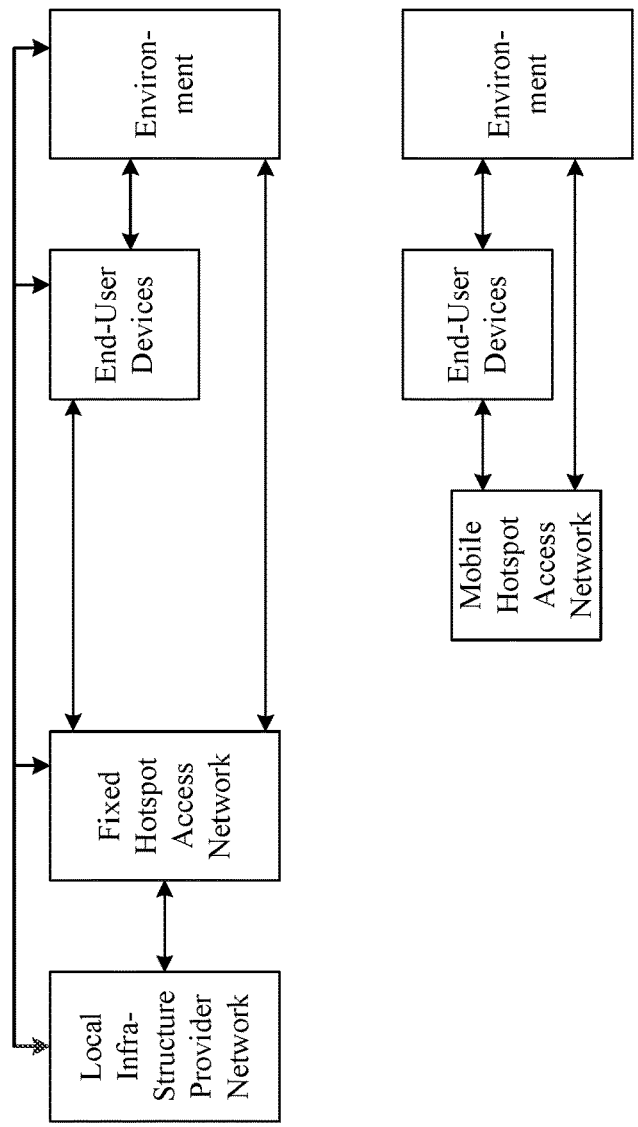

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, networks, and/or network components 100, 200, 300, 400, 500-570, 600, 700, 800, 900, 1000, 1100, and 1200, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
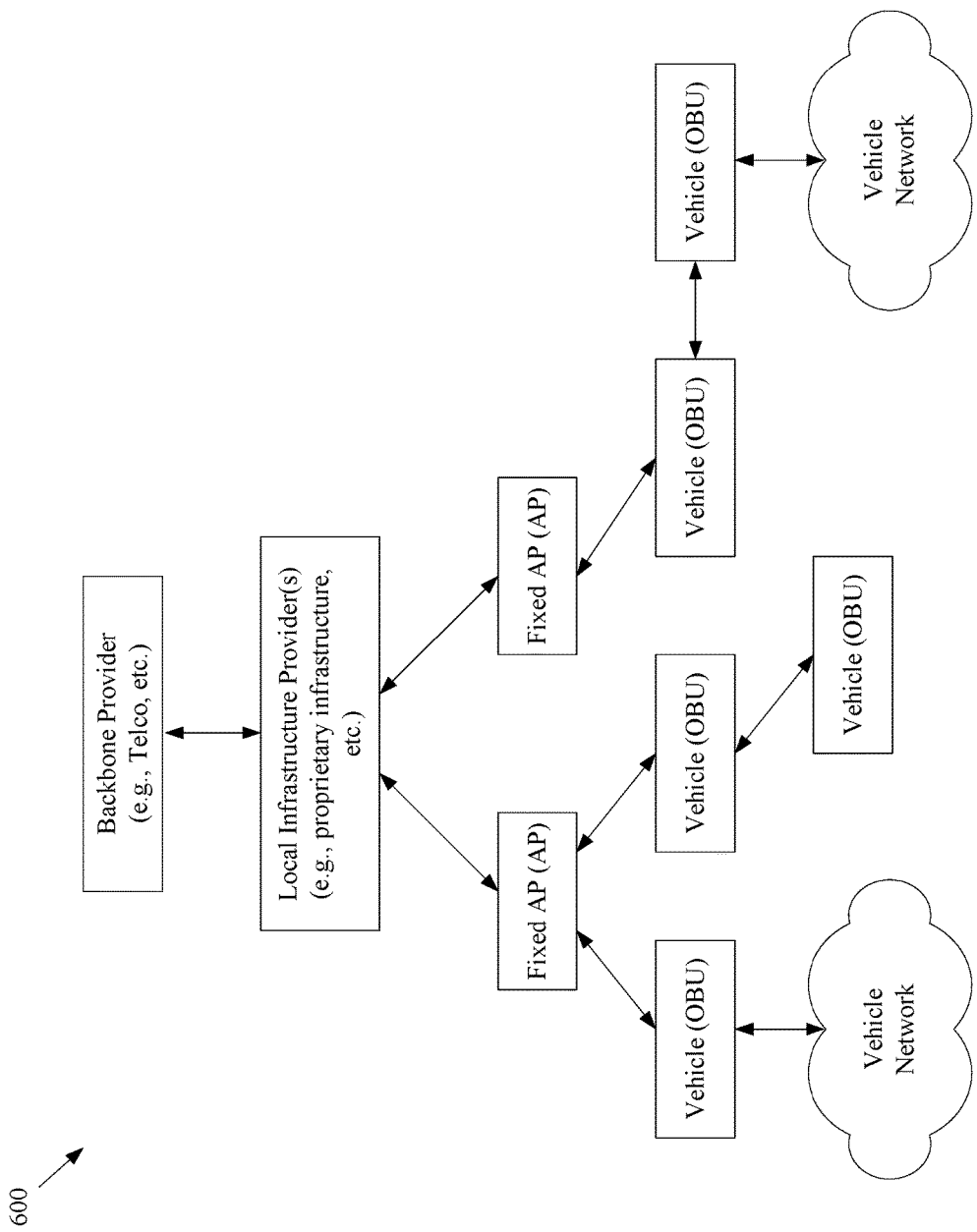
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, networks, and/or network components 100, 200, 300, 400, 500-570, 700, 800, 900, 1000, 1100, and 1200, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

Figure 7:
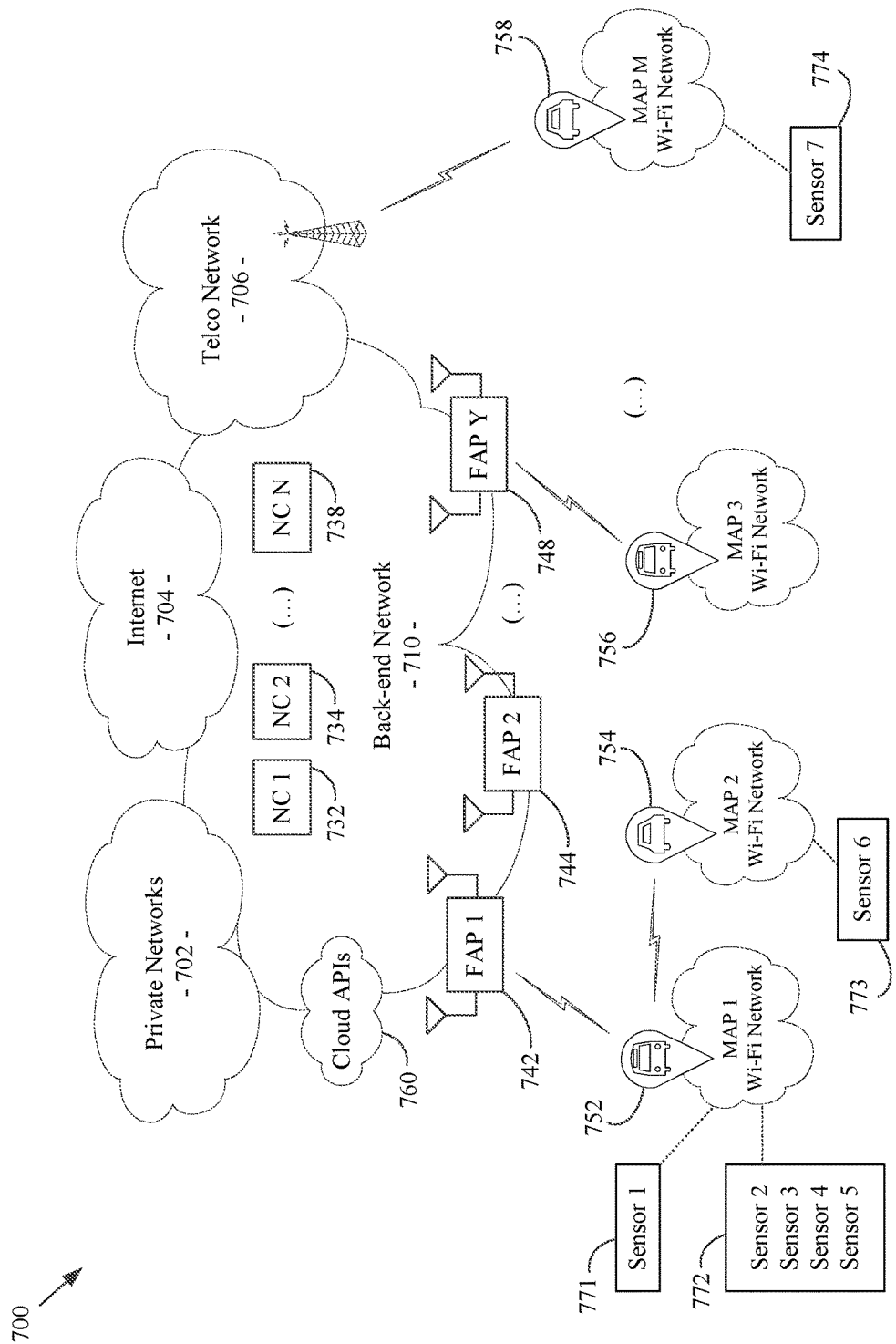
FIG. 7 shows a block diagram of an example communication network, in accordance with various aspects of the present disclosure.

FIG. 7 shows still another block diagram of an example communication network 700, in accordance with various aspects of the present disclosure. The example network 700 may, for example, share any or all characteristics with the other example methods, networks, and/or network components 100, 200, 300, 400, 500-570, 600, 800, 900, 1000, 1100, and 1200, discussed herein. Notably, the example network 700 shows a plurality of vehicles (or Mobile APs, or MAPs, or OBUs) 752, 754, 756, and 758, each communicatively coupled to a Fixed AP (or RSU) 742, 744, and 748 and/or a cellular network 706, where each Mobile AP may provide network access to a vehicle network (e.g., comprising other vehicles or vehicle networks, user devices, sensor devices, etc.), for example a Wi-Fi network to which end user devices may connect, with which communication with sensors may be performed, etc. The example network 700 may also, for example, comprise a plurality of Network Controllers 732, 734, and 738 (which may also be referred to herein as Mobility Controllers or LMAs). The example network 700 may also, for example, comprise any of a variety of interconnected networks (e.g., Private Networks 702, the Internet 704, Telecommunication Networks 706, etc.). One or more servers of the Cloud may, for example, be accessible via Cloud APIs 760.

The Mobile APs 752, 754, 756, and 758 may, for example, be communicatively coupled to various sensors (e.g., always, as the Mobile APs travel within range of such sensors, etc.). For example, in the example scenario shown in FIG. 7, a first MAP 752 is communicatively coupled to a first sensor 771 (e.g., Sensor 1) and a set of sensors 772 (e.g., Sensor 2, Sensor 3, Sensor 4, and Sensor 5), which may for example be co-located; a second MAP 754 is communicatively coupled to a sixth sensor 773; and an $M^{th}$ MAP 758 is communicatively coupled to a seventh sensor 774. The Mobile APs may, for example move in and out of communication range of the various sensors. The Mobile APs may, for example when in-range of such sensors, gather information from such sensors in a power-efficient and network-efficient manner, many examples of which are provided herein.

A Cloud Mobility Backend (CMB) may, for example, match Network controllers (or NCs or MCs) to MAPs. For example, as discussed in more detail herein, the CMB may perform a context-aware determination of the current best MC for a particular MAP. For example, the CMB may intelligently select an available, active, and compatible NC for a particular Mobile AP. The CMB may, for example, comprise the capability to know (e.g., through control messaging) the currently running version of mobile software in the NCs, FAPs, and/or MAPs. As discussed herein, the CMB may determine the best NC based on any of a variety of criteria. The CMB may also, for example, comprise the capability to monitor the health of the NCs (and other entities and/or the communication links utilized by such entities) and their ability to perform their tasks. The CMB may further, for example, perform load balancing between the Mobile APs (e.g., currently active Mobile APs, Mobile APs that are predicted to be active, etc.).

The CMB may, for example, be implemented as a Cloud API. The CMB may, however, be implemented in any of a variety of nodes of the network 700 (e.g., one or more nodes of the backbone or back-end network, etc.). Also for example, the CMB may be implemented at a single network node (e.g., a networked server, etc.) but may also be implemented in a plurality of nodes in a distributed manner. The CMB is discussed in more detail herein.

The Network Controller (NC) may, for example, comprise a network entity that manages a group of MAPs that are assigned to it. As discussed herein, the NC may also be referred to herein as a Mobility Controller (or MC). In an example implementation, when the NC receives a network location update from a MAP, the NC may update the procedures utilized by mobility services, for example the NC may update routes and/or tunnels utilized to forward the MAP's (or MAP's users') traffic to the updated network location. As shown in the example network 700, any number of NCs may be utilized.

The Fixed AP (FAP) may, for example, comprise a network entity that operates as a bridge between the wired backbone and the wireless environment. The FAP may, for example, forward traffic between the NCs and the MAPs that are within the FAP's wireless coverage area.

The FAP may, for example, be deployed in a same network as an NC. The FAP may also, for example, be deployed in a different (or foreign) network, in which case the FAP may connect to an NC through a secure VPN connection. The FAP may further, for example, connect to an NC through another FAP (e.g., utilizing a wireless link to the other FAP).

The Mobile AP (MAP) may, for example, be installed in a vehicle (e.g., an autonomous vehicle, a locally manually controlled vehicle, a remotely automatically controlled vehicle, a remotely manually controlled vehicle, etc.) or other moving object. The example network 700 is shown with four example vehicles, but any number may be present. The MAP may, for example, communicate with the backbone network (or back-end network) utilizing any one or more of a plurality of communication technologies. When the MAP switches communication technology (e.g., wireless interface technology) or access point (e.g., FAP), the MAP may inform its assigned NC about the MAP's new mobility context (e.g., network location, connectivity, etc.). Each MAP may, for example, comprise one or more local Wi-Fi APs through which its users (or clients) can connect and through which the MAP can communicate with sensors and/or other devices, etc.

In an example implementation, a MAP (e.g., upon power-up, upon entering or re-entering the network, periodically, in response to a detected anomaly, etc.) may query the CMB about which NC it can (or must) connect to (e.g., associate with). The CMB may then, for example, select the best NC among the set of available NCs and inform the MAP of the selected NC. The CMB may, for example, select the best NC based on any one or more of a variety of factors (e.g., load balancing considerations, performance metrics, number of assigned MAPS or clients per NC, statistical distribution, failure rate, error rate, available NC resources, fleets assigned to particular NCs, etc.), many non-limiting examples of which are provided herein.

Note, however, that the MAP may also determine the NC to which the MAP will try to connect based on information of any of such factors available in the network and/or Cloud. In other words, the MAP may determine its NC autonomously. In another example scenario, the MAP may determine its NC and then present the determined NC to the CMB as a preferred or requested NC, for example leaving ultimate control of the NC-to-MAP assignment to the CMB. In another example scenario, the CMB may indicate a recommended NC to the MAP, and the MAP may accept the recommendation or may (e.g., based on any of a variety of factors, etc.) determine that it would rather connect to an alternative NC, upon which the MAP may then negotiate with the CMB, ask permission from the CMB to connect, simply autonomously connect to the desired NC, etc.

During operation, the MAP may for example search for the best available access point with which to connect. The MAP may identify the best available AP (e.g., a FAP, another MAP, an access point (or base station) of another network different from the base network, etc.) based on any of a variety of criteria (e.g., signal strength, location, vehicle velocity, hop count, loading, quality-of-service, communication capability, planned trajectory, etc.). Such a search may, for example, be performed by a connection manager of the MAP.

If the Mobile AP (MAP) selects a Fixed AP (FAP) for connection, the MAP may connect to the selected FAP and send a control message to the NC to which the MAP is assigned, where the control message comprises mobility context information (e.g., the identification of the MAP, the identification of the FAP to which the MAP is now connected, etc.).

If the MAP selects another Mobile AP (MAP) for connection, the MAP may connect to the selected Mobile AP and send a control message to the NC to which the MAP is assigned, where the control message comprises mobility context information (e.g., the identification of the MAP, the identification of the Fixed AP that is the root of the multi-hop connection via the selected MAP, the identification of the selected MAP, etc.). This message may, for example, be relayed through the multiple nodes that compose the multi-hop chain until the message arrives at the appropriate FAP, which then forwards the message to the NC.

If there is no available AP (or no available AP that meets various requirements), the MAP may connect through a cellular link with a cellular base station and send a control message to the NC, where the message comprises mobility context information (e.g., the identification of the MAP, its cellular control IP information, etc.). Note that in a dynamic network in accordance with various aspects of the present disclosure, a Mobile AP may change the AP to which it is connected often (e.g., more than once per second, more than once per ten seconds, etc.).

The NC upon receiving and validating the control message may, for example, register the MAP in an internal database (if not yet present) and update the required routes and/or tunnels and/or addresses to the MAP in order to forward the MAP's and MAP's clients' traffic, respectively, to the updated network location. Note that in accordance with various aspects of the present disclosure, the control messages (or at least payload portions thereof) may be encrypted, for example by exchanging key information between the NC and the MAP.

Note that if a MAP does not receive a valid response (e.g., from the NC and/or other network entity) within a particular time, the MAP may retry (e.g., retry connecting to a same or different node).

The communication network, in accordance with various aspects of the present disclosure, provides flexibility to extend backend private networks to the vehicle network, for example allowing a user connected to the vehicle network to access an internal private network just as if the user was connected to the private network through an Ethernet connection or Wi-Fi connection of the premises of the private network.

Figure 8:
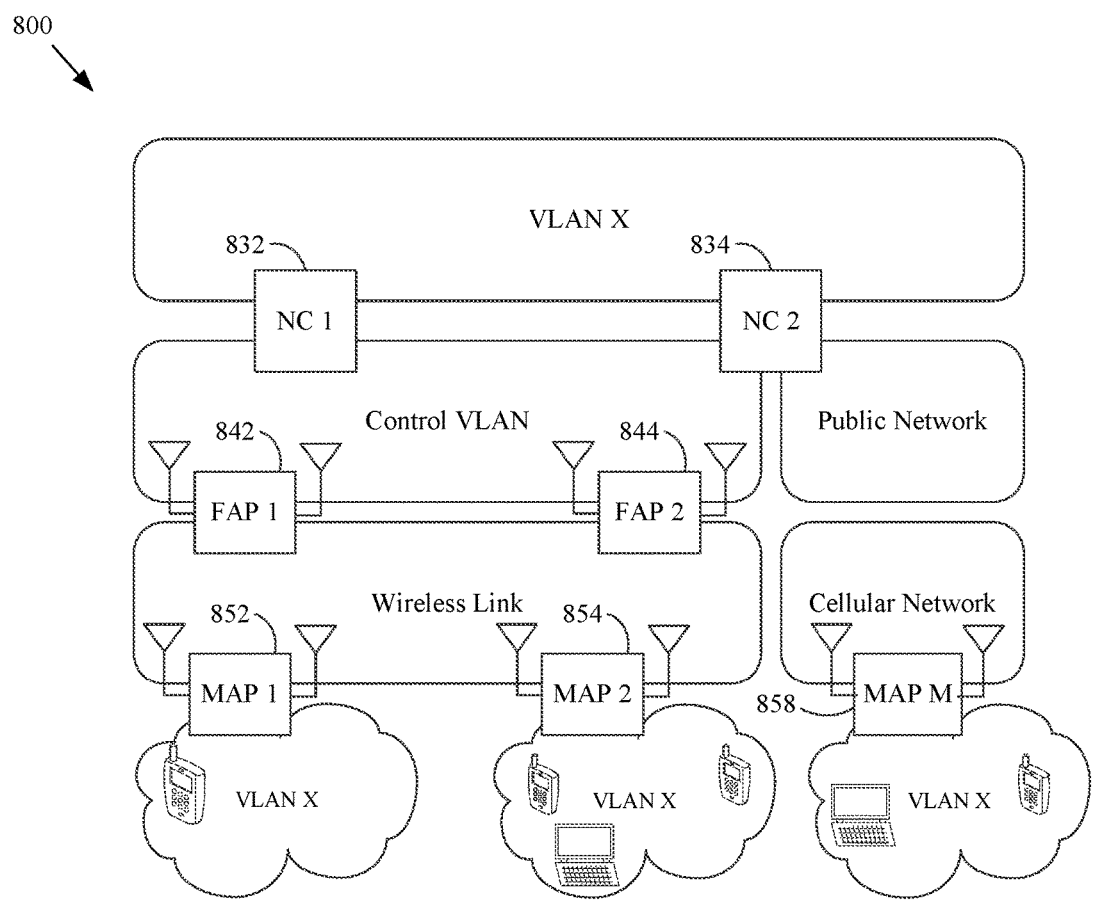
FIG. 8 shows a block diagram of an example communication network, in accordance with various aspects of the present disclosure.

As an example, FIG. 8 shows a block diagram of an example communication network 800, in accordance with various aspects of the present disclosure. The example network 800 may, for example, share any or all characteristics with the other example networks and/or network components 100, 200, 300, 400, 500-570, 600, 700, 900, 1000, 1100 and 1200 discussed herein. The example communication network 800 may, for example, be capable of extending a private network.

In an example implementation, a large company (or school or mall, etc.) campus comprises a private network that can only be accessed through the wired network or through the Wi-Fi access points installed in or on the buildings of the campus. Utilizing a communication network in accordance with various aspects of this disclosure, the private network may be extended to vehicles around the campus, where each vehicle may become a Wi-Fi hotspot that enables a user to access the private network as if the user was in an office of the campus with a direct connection (e.g., an Ethernet connection, a Wi-Fi connection, etc.). Though not shown in FIG. 8, the CMB may be implemented as a Cloud API, may be implemented in one or more servers associated with the NCs, in a server of the private network, etc.

As shown in FIG. 8, a first Mobile AP 852 may provide access to VLAN X to one or more user devices via a wireless link with a first Fixed AP 842 (or other FAP), via another communication link (e.g., wired, tethered optical, wireless, non-tethered optical, etc.) with a first Network Controller 832 (or other NC). Similarly, a second Mobile AP 854 may provide access to VLAN X to one or more user devices via a wireless link with a second Fixed AP 844 (or other FAP), via another communication link (e.g., wired, tethered optical, wireless, non-tethered optical, etc.) with a second Network Controller 834 (or other NC). Additionally, an $M^{th}$ Mobile AP 858 may provide access to VLAN X to one or more user devices via a wireless link with an AP (or base station) of a cellular network, via another communication link (e.g., wired, tethered optical, wireless, non-tethered optical, etc.) with the second Network Controller 834 (or other NC).

Figure 9:
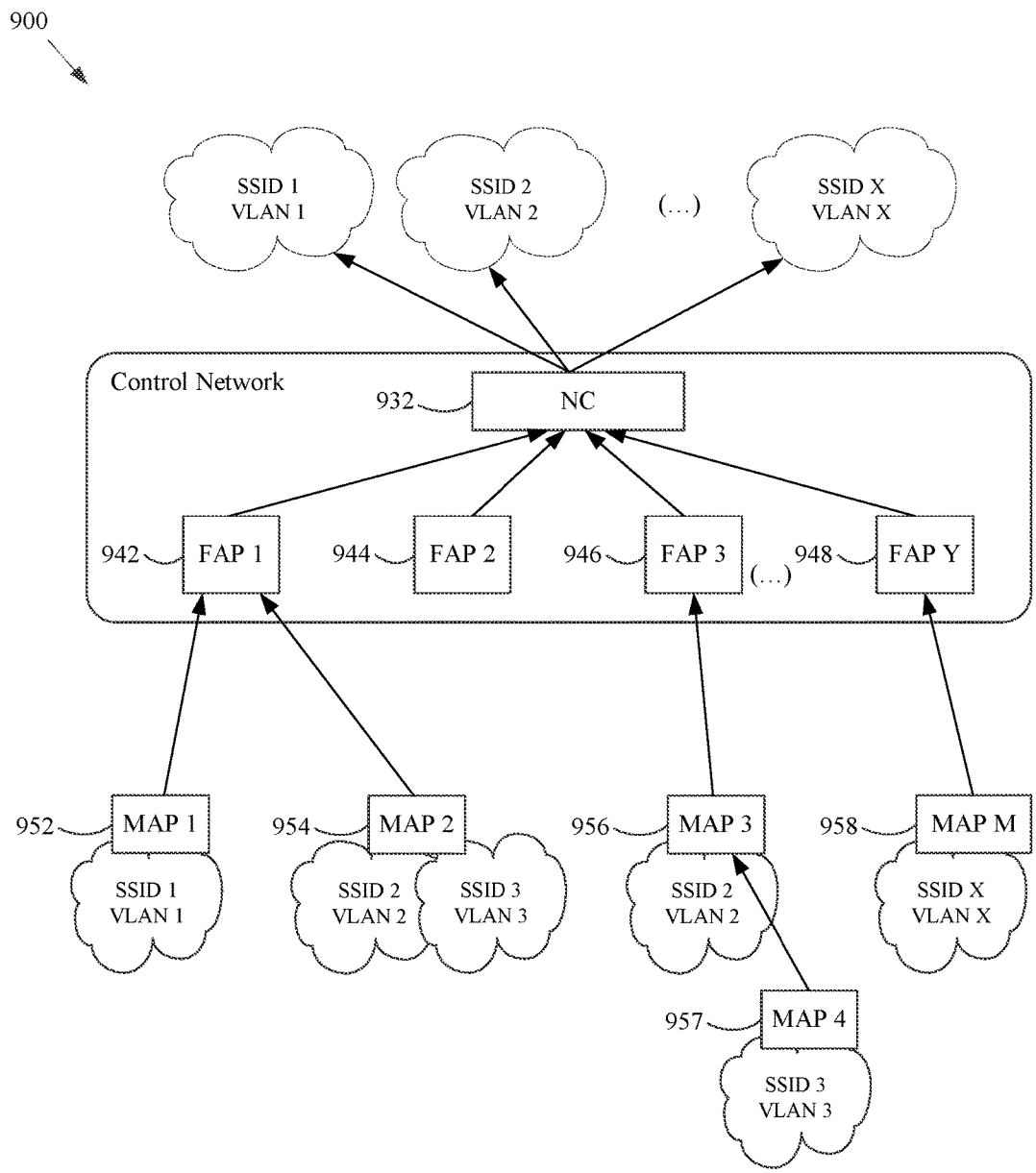
FIG. 9 shows a block diagram of an example communication network, in accordance with various aspects of the present disclosure.

Such private network extension also applies, for example, to a plurality of private networks. For example, the MAP can broadcast respective SSIDs for Wi-Fi networks that enable access to different respective private networks. An example implementation is illustrated at FIG. 9, which shows a block diagram of an example communication network 900, in accordance with various aspects of the present disclosure. The example network 900 may, for example, share any or all characteristics with the other example networks and/or network components 100, 200, 300, 400, 500-570, 600, 700, 800, 1000, 1100 and 1200 discussed herein.

As shown in FIG. 9, a first Mobile AP 952 may provide access to VLAN 1 (with SSID 1) to one or more user devices via a wireless link with a first Fixed AP 942 (or other FAP), via another communication link (e.g., wired, tethered optical, wireless, non-tethered optical, etc.) between the first Fixed AP 942 and a Network Controller 932 (or other NC), and via one or more other communication links (e.g., wired, tethered optical, wireless, non-tethered optical, etc.) between the NC 932 and the network hosting VLAN 1. Also, a second Mobile AP 954 may provide access to VLAN 2 (with SSID 2) and VLAN 3 (with SSID 3) to one or more user devices via a wireless link with the first Fixed AP 942 (or other FAP), via another communication link (e.g., wired, tethered optical, wireless, non-tethered optical, etc.) between the first Fixed AP 942 and the Network Controller 932 (or other NC), and via one or more other communication links (e.g., wired, tethered optical, wireless, non-tethered optical, etc.) between the NC 932 and the network(s) hosting VLAN 2 and VLAN 3. Additionally, a third Mobile AP 956 may provide access to VLAN 2 (with SSID 2) to one or more user devices via a wireless link with a third Fixed AP 946 (or other FAP), via another communication link (e.g., wired, tethered optical, wireless, non-tethered optical, etc.) between the third Fixed AP 946 and the Network Controller 932 (or other NC), and via one or more other communication links (e.g., wired, tethered optical, wireless, non-tethered optical, etc.) between the NC 932 and the network hosting VLAN 2. Further, a fourth Mobile AP 957 may provide access to VLAN 3 (with SSID 3) to one or more user devices via a wireless link with the third Mobile AP 956, via a wireless link between the third Mobile AP 956 and the third Fixed AP 946, via another communication link (e.g., wired, tethered optical, wireless, non-tethered optical, etc.) between the third Fixed AP 946 and the Network Controller 932 (or other NC), and via one or more other communication links (e.g., wired, tethered optical, wireless, non-tethered optical, etc.) between the NC 932 and the network hosting VLAN 3. Still further, an $M^{th}$ Mobile AP 958 may provide access to VLAN X (with SSID X) to one or more user devices via a wireless link with a $Y^{th}$ Fixed AP 948 (or other FAP), via another communication link (e.g., wired, tethered optical, wireless, non-tethered optical, etc.) between the $Y^{th}$ Fixed AP 948 and the Network Controller 932 (or other NC), and via one or more other communication links (e.g., wired, tethered optical, wireless, non-tethered optical, etc.) between the NC 932 and the network hosting VLAN X.

A communication network in accordance with various aspects of this disclosure, many examples of which are provided herein, may be utilized to provide regular, reliable, and robust Internet access to users. For example, a user may connect to the MAP, which will forward its traffic to its assigned NC, which will then perform the network requests on behalf of the user. The reply is then forwarded to the same MAP from which the request came to ultimately be delivered to the user.

In an example scenario in which the user migrates to a new MAP (or FAP), the new MAP (or FAP) may inform the NC so that the NC knows the new network location of the user. The NC may, for example after receiving this information from the MAP, share it with the other available NCs so that the user location gets updated in all of them.

As discussed herein, a Mobile AP may be connected to the backend network in a variety of manners. For example, a Mobile AP may be connected to the backend network via a direct wireless link between the Mobile AP and a Fixed AP, which enables the Mobile AP to communicate with the NC through the Fixed AP. Also for example, a Mobile AP may be connected to the backend network via a public IP address. For example, a Mobile AP (or other node) can connect to the NC over a cellular network using the public IP address assigned to its cellular interface. Additionally, such connection may be established by direct routing through a VPN. For example, a Mobile AP (or other node) that does not have a public IP address but wants to connect over cellular can establish a VPN connection and use it to connect to the NC. The VPN server may, for example, be one of the available NCs, may be distributed between all NCs, or may also be an external entity.

A communication network in accordance with various aspects of the present disclosure may comprise any of a variety of characteristics and provide any of a variety of advantages over traditional systems. For example, control message traffic may be reduced. For example in an example implementation, the Mobile AP need only send a control message to the NC when the Mobile AP changes its connection. An end user device may, for example, treat the connection to the Mobile AP like a connection with any other Wi-Fi hotspot, for example just connecting once and then keeping the same IP address (e.g., even though the Mobile AP may be changing its connection and/or even though the user may travel between Mobile APs).

Additionally, in a communication network in accordance with various aspects of this disclosure, the number of routes and tunnels may also be kept low. For example, each vehicle might have its own routes and tunnels, but the user devices may be masked under those, for example eliminating the need for a route and/or tunnel for each user device. Note that the tunnels discussed herein may comprise any of a variety of characteristics and/or types (e.g., IPv4-in-IPv4, IPv4-in-IPv6, IPv6-in-IPv4, IPv6-in-IPv6, ipsec, etc.). The handover times may also be minimized; the average handover time may, for example, be approximately the new connection link latency between the MAP and the NC.

The number of Mobile APs under each NC may be readily adapted through the CMB, which results in relatively fast response times, for example in case of an NC failure, a sudden user load increase, etc. Management of the NCs is also simplified. For example, adding new NCs, supporting multiple simultaneously active versions in the network, and removing old NCs may all be performed without disrupting the rest of the network.

Note that although the NC is generally presented herein by example as an entity in the network backbone (or backend), the NC may be implemented in any of a variety of network locations (or types of nodes). For example, an NC may be implemented in a single AP (e.g., in a Fixed AP, etc.). Also for example, NC functionality may be distributed among a plurality of APs (e.g., in a plurality of Fixed APs, etc.). In an AP-based implementation, the management of the Mobile AP's position in the network (e.g., CMB functionality, etc.) may be performed between the Fixed APs, which share the information between them by specific control messages that identify the Mobile AP (or the Mobile AP assigned to each user), its point of connection, its current serving NC and the registration timeout, etc.). One or several of the Fixed APs may also, for example, operate as proxies to allow the Mobile APs to connect through external networks (e.g., cellular, etc.). In an example implementation in which the NC or a portion thereof is implemented in a Fixed AP, scalability and redundancy may be enhanced, latency may be reduced, etc.

In accordance with various aspects of the present disclosure, a node (e.g., a Mobile AP, etc.) may send and receive data through multiple different nodes and/or multiple different technologies (e.g., wireless communication technologies, etc.) simultaneously, which may be referred to herein as "multi-homing." For example, in one example implementation, a node registration process may provide for multiple registrations for the same node (e.g., for the same Mobile AP, etc.). For example, a unique device identification may be associated with multiple IP addresses that may, for example, be selectively utilized based on the context.

Figure 10:
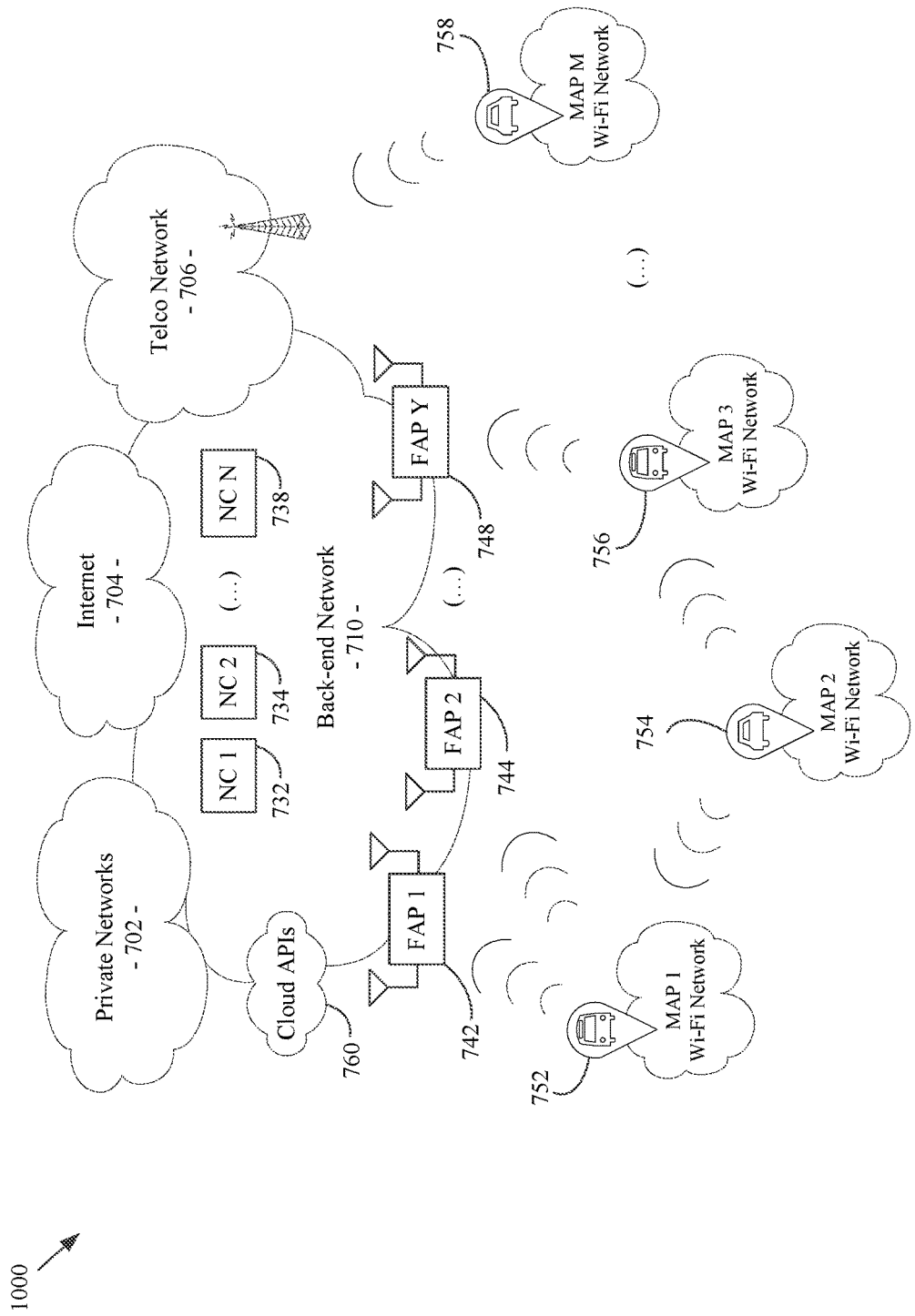
FIG. 10 shows a block diagram of an example communication network, in accordance with various aspects of the present disclosure.

An example of a communication network incorporating multi-homing functionality is provided in FIG. 10, which shows a block diagram of an example communication network 1000, in accordance with various aspects of the present disclosure. The example network 1000 may, for example, share any or all characteristics with the other example networks and/or network components 100, 200, 300, 400, 500-570, 600, 700, 800, 900, 1100 and 1200, discussed herein.

In a multi-homing configuration the multiple communication pathways may be utilized for multiple independent respective communication streams (e.g., based on communication priority, for example QoS requirements, emergency communication status, user VIP status, etc.). Also for example, a single communication stream may be divided into separate portions, each of which assigned to a respective communication path (e.g., voice over a relatively reliable path, video over a relatively cheaper and less reliable path, etc.). Additionally for example, a same communication may be communicated through multiple pathways to help ensure delivery.

Figure 11:
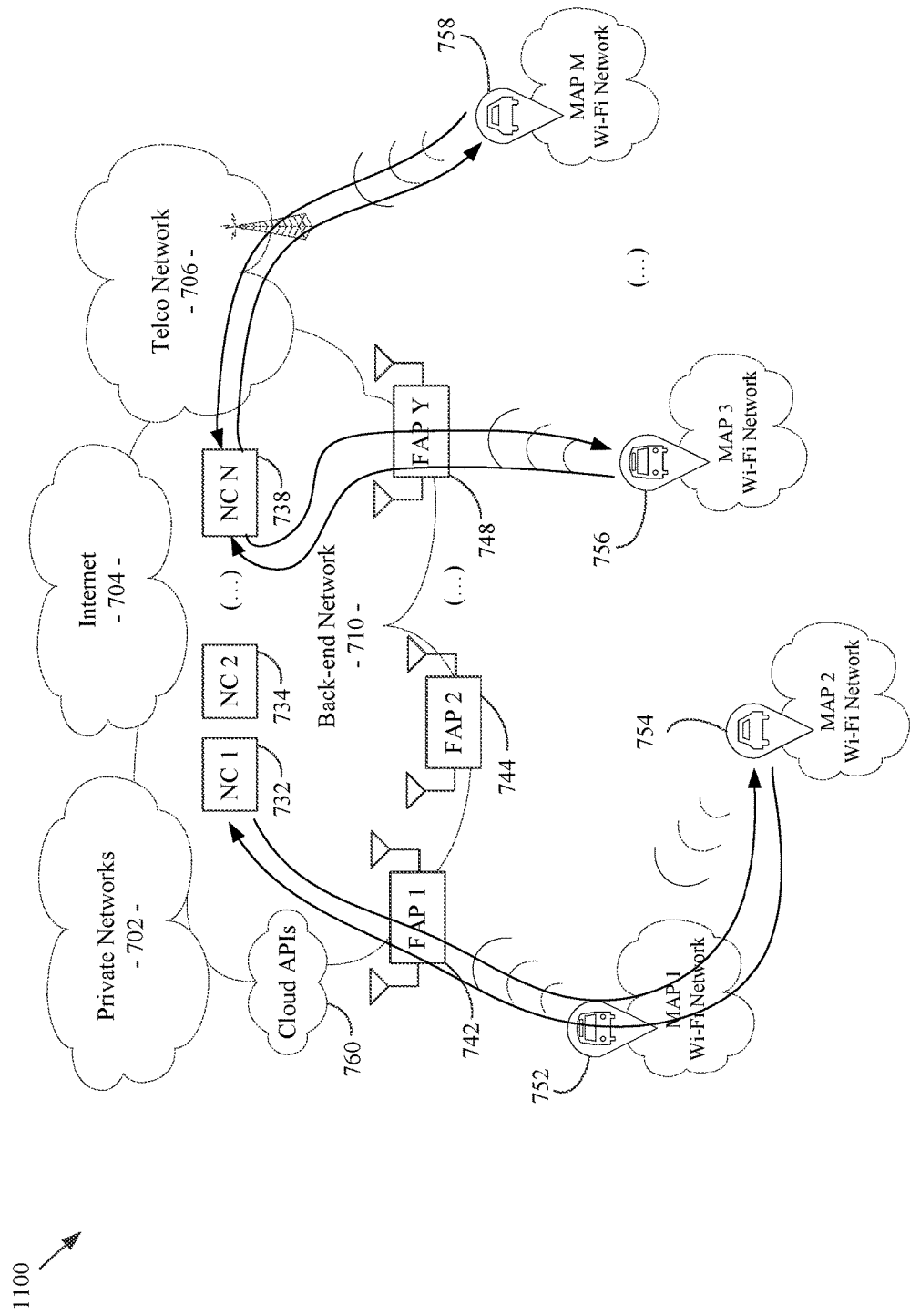
FIG. 11 shows a block diagram of an example communication network, in accordance with various aspects of the present disclosure.

As discussed herein, the NC (e.g., any one or more of the example NCs 732, 734, 738, etc.) may keep track of the Mobile AP's (e.g., any one or more of the example MAPs 752, 754, 756, 758, etc.) mobility context (e.g., network locations, IP addresses, routes, tunnels, etc.), for example either autonomously and/or in conjunction with the CMB). This knowledge facilitates the forwarding of information to the Mobile AP along the correct network pathway. The various nodes of the network may share context information. For example, as discussed herein, the Mobile APs may communicate control messages with the NC(s). An example communication network is shown in FIG. 11, which shows a block diagram of an example communication network 1100, in accordance with various aspects of the present disclosure. The example network 1100 may, for example, share any or all characteristics with the other example networks and/or network components 100, 200, 300, 400, 500-570, 600, 700, 800, 900, 1000 and 1200, discussed herein.

As shown in FIG. 11, the second Mobile AP 754 may send control messages to an example first NC 732 via the first Mobile AP 752 and via the first Fixed AP 742. The return control messages from the first NC 732 may, for example, follow the reverse path. Also, an example third Mobile AP 756 may send control messages to the example $N^{th}$ NC 738 via the $Y^{th}$ Fixed AP 748. The return control messages may, for example, follow the reverse path. Additionally, the example $M^{th}$ Mobile AP 758 may send control messages to the example $N^{th}$ NC 738 via a cellular telecommunication link (e.g., via the example Telco Network 706). The return control messages may, for example, follow the reverse path.

The control messages from the Mobile AP to the NC may comprise any of a variety of different types of mobility context information, non-limiting examples of which are provided herein. For example, such control messages may comprise the Mobile AP identification, the identification of the Mobile AP's point of attachment to the network, a message sequence number and identification, information about the Mobile AP's user(s), information about the Mobile AP's loading, available resources, bandwidth utilization, power supply, noise conditions, error rate, quality-of-service needs, etc. Also for example, the control messages from the NC to the Mobile AP may comprise any of a variety of different types of control information, non-limiting examples of which are provided herein. For example, such control messages may comprise message sequence number and identification information, an error code in case of a failure, a registration granted and/or failed indication, etc.

Note that some of all of the vehicle mobility context information may originate from a vehicle navigation or control system (e.g., from an autonomous vehicle, from a manually controlled vehicle, from an automatically remotely controlled vehicle, from a manually remote controlled vehicle, etc.). Such information may, for example, comprise vehicle type or identifying information, vehicle location or route or trajectory information, vehicle operational health information, etc.

As discussed herein, in accordance with various aspects of this disclosure, a Cloud Mobility Backend (CMB) may interact with the NC (and/or other nodes) to make the network more distributed, reliable, and scalable. For example, various aspects of this disclosure provide for intelligent assignment of NC to Mobile AP. Also for example, various aspects of this disclosure provide for the dynamic addition and/or removal of NCs from the network while the network remains fully operational. Additionally for example, various aspects of this disclosure support fail recovery for failed and/or failing (or underperforming) NCs.

In an example implementation the NC may periodically (and/or upon request, for example upon request by a CMB, and/or in response to a detected significant change in condition) send a control message to the CMB, where the control message may comprise information indicative of the status of the NC. Such status may comprise any of a variety of status characteristics (e.g., CPU utilization and/or availability, memory utilization and/or availability, number of nodes (e.g., Mobile APs, clients, etc.) being served, power utilization and/or availability, communication link status (e.g., downstream and/or uplink communication link effectiveness, bottlenecks, etc.), message queue size, amount and/or type of Internet communication requests, the mobility versions (e.g., software versions, etc.) supported, whether the NC is active or dormant or failed, etc.

The CMB, for example upon receiving and validating the control message from the NC, may then know the current status of the NC. Note that the control message from the NC may be unsolicited (e.g., in response to a local timer, in response to conditions identified by the NC, etc.), or may be solicited (e.g., in response to a request message from the CMB, in response to a request from another node, in response to another API in the cloud, etc.).

As discussed herein, various aspects of the present disclosure provide for the CMB to assign an NC to manage communications with a Mobile AP (e.g., to provide a communication interface between the Mobile AP and sites (e.g., via the Internet and/or any of a variety of networks), to provide a communication interface between the Mobile AP and other nodes (e.g., cloud-based nodes or APIs, etc.), etc.).

In an example scenario, the CMB may determine an NC to assign to the Mobile AP based, at least in part, on the version of the mobility version being run at the NC and/or at the Mobile AP. For example, in an example scenario, a Mobile AP may query (or request) the CMB to assign an NC to the Mobile AP. The Mobile AP may perform such a query in response to a power-up condition, a reset condition, a loss of contact with a presently-assigned NC, a detected degradation in performance (e.g., unacceptable latency, unacceptable error rate, etc.), a user input, a substantial change in geographic position, etc. The query (or request) may comprise a message sent from the Mobile AP to the CMB that may comprise any of a variety of types of information, one type of which may comprise information regarding the mobility version being run at the Mobile AP. The CMB may utilize such version information, at least in part, to select an NC (or a group thereof) to assign to the Mobile AP. For example, the CMB may remove candidate NCs from a list of potential NCs, if such removed NCs do not support the version(s) supported by the Mobile AP. Note that mobility version may be one of a plurality of criteria used to select the NC for the Mobile AP. For example, though the CMB may identify a group of MCs that supports the mobility version being run by the Mobile AP, the CMB may also analyze any of a variety of the other criteria, examples of which are presented herein, to ultimately select the MC for the Mobile AP.

In an example implementation, the CMB may determine the NC for a Mobile AP based, at least in part, on load-balancing considerations. For example, as discussed herein, an NC may provide any of a variety of interface services to a Mobile AP (or client(s) thereof, etc.), for example Internet interface services, managing hand-off for a Mobile AP between a first AP and a second AP, etc. In an example scenario in which a plurality of NCs are available to provide such services, the CMB may select an NC to assign to a Mobile AP by identifying the NC of the plurality of NCs that has the lightest load (or anticipated load). The CMB may determine a respective load for an NC in any of a variety of manners. For example, the CMB may determine a respective load based on a number of Mobile APs (and/or clients thereof) assigned to the NC. Also for example, the CMP may determine a respective load for an NC based on communication bandwidth utilization and/or bandwidth availability for the NC (e.g., as determined by the NC based on traffic to and/or from the NC, as determined by the NC based on control message information received from the NC, etc.).

Note that the CMB may also re-assign or shuffle (e.g., rebalance) the NC-to-MAP assignments. For example, in an example scenario in which a new Mobile AP is anticipated to demand a relatively large amount of bandwidth while the NC load is presently balanced, assigning the new MAP to the NC may create a substantial load imbalance. In such an example scenario, other Mobile APs (e.g., Mobile APs that have already been assigned to the selected NC) may be shifted from the selected NC to other NCs to ultimately create a more balanced load distribution.

The CMB may also, for example, determine the NC for the Mobile AP based, at least in part on performance need of the Mobile AP (and/or one or more clients thereof) and on performance level provided by the NC. For example, one or more NCs may be managed (e.g., loaded, etc.) to be able to maintain at least a threshold level of service, for example less than a threshold amount of latency, less than a threshold error rate, etc.). In an example scenario, a group of one or more NCs may be managed to have a loading that is low enough to prevent bottlenecks that would otherwise prohibit a particular level of service from being provided. For example, a first group of one or more NCs may be designated to be managed to provide voice traffic, a second group of one or more NCs may be designated to be managed to provide a level of service that is at least good enough to support video and/or music service, a third group of one or more NCs may be designated to be managed to provide a general best effort level of service, etc. In such a scenario, the CMB may determine the desired level of service for the Mobile AP and select an NC for the Mobile AP that is managed to be able to consistently provide the desired level of service. For example, if it is known that the Mobile AP must be able to support voice traffic (e.g., by contractual agreement, based on characteristics of typical clients, based on the priority of typically communicated information, based on present needs, etc.), the CMB may select an NC that is being managed (e.g., loaded, etc.) to be able to support voice traffic. Also for example, if it is known that the Mobile AP generally communicates sensor information that is associated with a "best effort" type of service, the CMB may select an NC that is being managed (e.g., loaded, etc.) to provide a "best effort" type of service, for example in which at least some degree of latency in the communication of information is acceptable.

As discussed herein, the CMB may also identify an NC for a Mobile AP based, at least in part, on the type of information being communicated by the Mobile AP and/or anticipated to be communicated by the Mobile AP. As discussed herein, a Mobile AP may generally communicate particular types of information (e.g. voice information, video information, sensor information, text or email information, music, etc.). As also discussed herein, an NC may be managed (e.g., loaded, coupled to the Internet via appropriate links, etc.) to meet particular latency requirements, bandwidth utilization goals, etc. In an example scenario in which the Mobile AP is generally associated with the communication of sensor information without real-time delivery requirements, the CMB may identify an NC that is relatively highly loaded, since real-time delivery requirements are relatively light. In another example scenario in which the Mobile AP is generally associated with the communication of VoIP information, the CMB may identify an NC that is relatively lightly loaded to reduce latency.

The CMB may, for example, determine an NC for a Mobile AP based, at least in part, on present performance of the NCs. For example, the CMB may select an NC that is associated with a lowest number of failures and/or with a lowest error rate and/or retransmission rate. The CMB may also, for example, select such an NC for a Mobile AP that is associated with low-latency communications, and then select a lower-performance NC for assignment to a Mobile AP that is generally associated with low priority data communication and/or with the communication of delay tolerant information.

Additionally, the CMB may determine an NC for a Mobile AP based, at least in part, on random selection. Further, the CMB may determine an NC for a Mobile AP based, at least in part, on a statistical distribution. For example, the CMB may determine the NC based, at least in part, on maintaining a consistent average number of Mobile APs (or clients thereof) per NC. Also for example, the CMB may determine the NC based, at least in part, on balancing the average expected bandwidth needs of the Mobile APs between the NCs. The CMB may also, for example, consider statistical variance or standard deviation (e.g., of bandwidth need) for Mobile APs when assigning an NC to a Mobile AP. For example, Mobile APs associated with a high variance in bandwidth need may be spread evenly over a plurality of NCs, for example refraining from assigning an NC to a disproportionately large number of Mobile AP with high respective variances. Predictable consistency may thus be obtained between the NCs.

Also for example, the CMB may select an NC for the Mobile AP based, at least in part, on likelihood of various events. For example, in an example scenario, a Mobile AP may generally utilize a first amount of bandwidth but may utilize a second amount of bandwidth N % of the time. When selecting an NC for such Mobile AP, the CMB may ignore the second amount of bandwidth, but may also calculate a weighted average of bandwidth utilization for the Mobile AP and base the NC selection, at least in part, on the weighted average. In another example scenario, the CMB may ignore the first amount of bandwidth, for example adopting a conservative approach and assuming that the second amount of bandwidth will be needed.

The CMB may, for example, select an NC for the Mobile AP based, at least in part, on historical information. For example, the CMB may identify the NC that has historically been assigned to the Mobile AP. Also for example, the CMB may determine whether the historically assigned NC provided service to the Mobile AP at the desired level of quality, for example selecting a different NC if the historically-assigned NC has performed inadequately for the Mobile AP in the past. Additionally for example, the CMB may over time track any of a variety of performance metrics that may be associated with an NC (e.g., throughput, latency, reliability, etc.) and develop a set of average performance metrics (e.g., a rolling average, weighted average, etc.) for the NC. The CMB may then consider such historical metric information when determining whether a particular MC should be selected for a particular Mobile AP (or group thereof).

Further for example, the CMB may select an NC for the Mobile AP based, at least in part on location. Such location may, for example, comprise location of the NC and/or location of the Mobile AP (e.g., current location of the Mobile AP when contacting the CMB for an NC assignment, average location over an anticipated vehicle route (e.g., as received from a vehicle navigation system, as received from an autonomous vehicle or central controller thereof, etc.), home base location, etc.). For example, the CMB may select the NC that is the closest to the location or expected location of the Mobile AP. Alternatively, for example, the CMB may select the NC for the Mobile AP in a manner that evenly distributes coverage for a plurality of NCs across a geographical area (e.g., overlapping management areas).

The CMB may also, for example, select the NC for the Mobile AP based on a fleet (or other grouping). For example, a particular NC (or group thereof) may be designated to serve as the NC for a particular fleet of vehicles. Also for example, a fleet (or other grouping) of vehicles may be allocated evenly across a group of NCs. In such a scenario, the CMB may select the NC of the group of NCs that has the fewest Mobile APs of the fleet assigned to it. In an example scenario, a particular first NC may be selected to manage all Mobile APs operating on buses, trains, and/or other public transportation vehicles, a particular second NC may be selected to manage all Mobile APs operating on privately operated vehicles (e.g., taxi cabs, private waste management vehicles, etc.), a particular third NC may be selected to manage all Mobile APs operating on public service vehicles other than public transportation vehicles (e.g., public waste management vehicles, road service vehicles, emergency vehicles, port authority vehicles, etc.), a particular fourth NC (or group thereof) may be selected to manage all Mobile APs operating on a particular fleet of autonomous vehicles, etc.

Note that any or all of the parameters discussed herein may be considered (or not) in a configurable manner. NC-selection heuristics may, for example, be manually configurable and/or may be configurable automatically as assignments are made and performance is monitored. Also for example, the NC-selection heuristics may be different for different Mobile APs (or classes thereof). For example, an NC may be selected for a Mobile AP of a bus in a different manner than an NC may be selected for a Mobile AP of a waste disposal vehicle. Also for example, an NC may be selected for a manually controlled vehicle in a different manner than an NC may be selected for an autonomous vehicle. As discussed here, for example, each type of Mobile AP may have different performance needs and such needs may also change over time (e.g., based on needs of a present client base, based on the addition or removal of sensors along a route, etc.).

In addition to the intelligent assignment of NCs to Mobile APs, various aspects of this disclosure also provide for adjusting the set of NCs utilized in the network. For example, an NC may be added to the network without modifying the Mobile APs. In an example scenario, a new NC may register itself with the CMB and then be considered for assignment to Mobile APs, for example in any of the manners discussed herein. Also for example, as the opportunity arises, Mobile APs may be seamlessly shifted to the new NC (e.g., while no outstanding network requests exist, during dormant periods, when Mobile APs go on and off line, etc.). In this manner, as network demands for NC functionality increase, additional NCs may be added. In an example scenario, a new NC may be installed and/or tested, and then made available upon demand. Note that an NC may also be removed from the network, for example during periods of little or no activity, after migration of all current Mobile APs from the NC to one or more other MCs, etc.

Various aspects of this disclosure further provide for MC failure recovery. For example, if a CMB determines that an NC has failed (e.g., due to the CMB failing to receive a periodic control message from the NC, due to the NC communicating a message to the CMB indicating that the NC has failed or is failing, due to the CMB monitoring throughput, latency, error rates, etc.), the CMB may take the NC offline. For example, if the NC has completely failed, the CMB may immediately assign all of the Mobile APs assigned to the failed NC to one or more other NCs. Also for example, if the NC is merely experiencing difficulties, but is at least partially functional, the CMB may gradually move all of the Mobile APs assigned to the failing NC to one or more other NCs. Additionally for example, if a redundant NC is currently available, the CMB may move all of the Mobile APs assigned to the failed/failing NC to the redundant NC (e.g., to free the original NC for rebooting or resetting, for diagnostics, for maintenance, etc. In any of such examples, the CMB may communicate a message to the Mobile APs indicating the change in NC. Similarly, the CMB may communicate a message to all of the other operational NCs notifying such NCs of the change. In the case of a failed/failing NC, the CMB may, for example, select a new NC for a Mobile AP based at least in part on any or all of the criteria discussed herein.

As discussed herein, the CMB may assign an NC to a Mobile AP based, at least in part, on the mobility version(s) supported by the NC and the Mobile AP. In an example implementation, the Fixed APs need not be concerned with such compatibility. For example, in such an example implementation, the Fixed APs need only operate as a conduit between the NC and the Mobile AP, regardless of the mobility versions being run.

In various scenarios, the CMB and the Fixed AP (FAP) may communicate, for example regarding NC availability. In a first example scenario in which a FAP is connected on a foreign network, the FAP may periodically query the CMB for information about the available NCs. Upon receiving such information from the CMB, the FAP may establish a secure VPN with each one of the available NCs. The FAP may thus be able to forward traffic from each Mobile AP to the appropriate NC. In a second example scenario in which a FAP is connected through a mesh link, the FAP may periodically query the CMB for information about the available NCs. Upon receiving such information from the CMB, the FAP may establish a secure tunnel to each one of the available NCs. The FAP may thus be able to forward traffic from each Mobile AP to the appropriate NC.

Though the CMB has been generally presented as the decision making entity for NC selection for a Mobile AP, it should be understood that any of a variety of entities may perform such decision making and/or at least participating in the decision-making process. For example, the Mobile AP may (e.g., autonomously and/or in conjunction with other nodes) play a significant role in the selection of the NC for the Mobile AP. For example, in an example scenario, the Mobile AP may probe the network, gathering information from the surrounding nodes (e.g., information regarding any of the decision parameters discussed herein). The Mobile AP may then, for example, process such information to select the best NC for its needs. For example, the Mobile AP may select an NC with which the Mobile AP has previously worked successfully. Alternatively, the Mobile AP may refrain from selecting an NC with which the Mobile AP has prior unsatisfactory experiences (e.g., too much latency, too many retransmissions, etc.). Note that the Mobile AP may also work with the CMB in a distributed manner to identify the best NC for the Mobile AP. For example, the Mobile AP may have immediate access to real-time network conditions in the field, while the CMB has a comprehensive view of the entire network. In an example scenario, the Mobile AP may suggest a desired NC and/or the CMB may suggest a desired NC, and the other entity may then agree, disagree, and/or suggest an alternative selection (e.g., engaging in negotiations).

Figure 12:
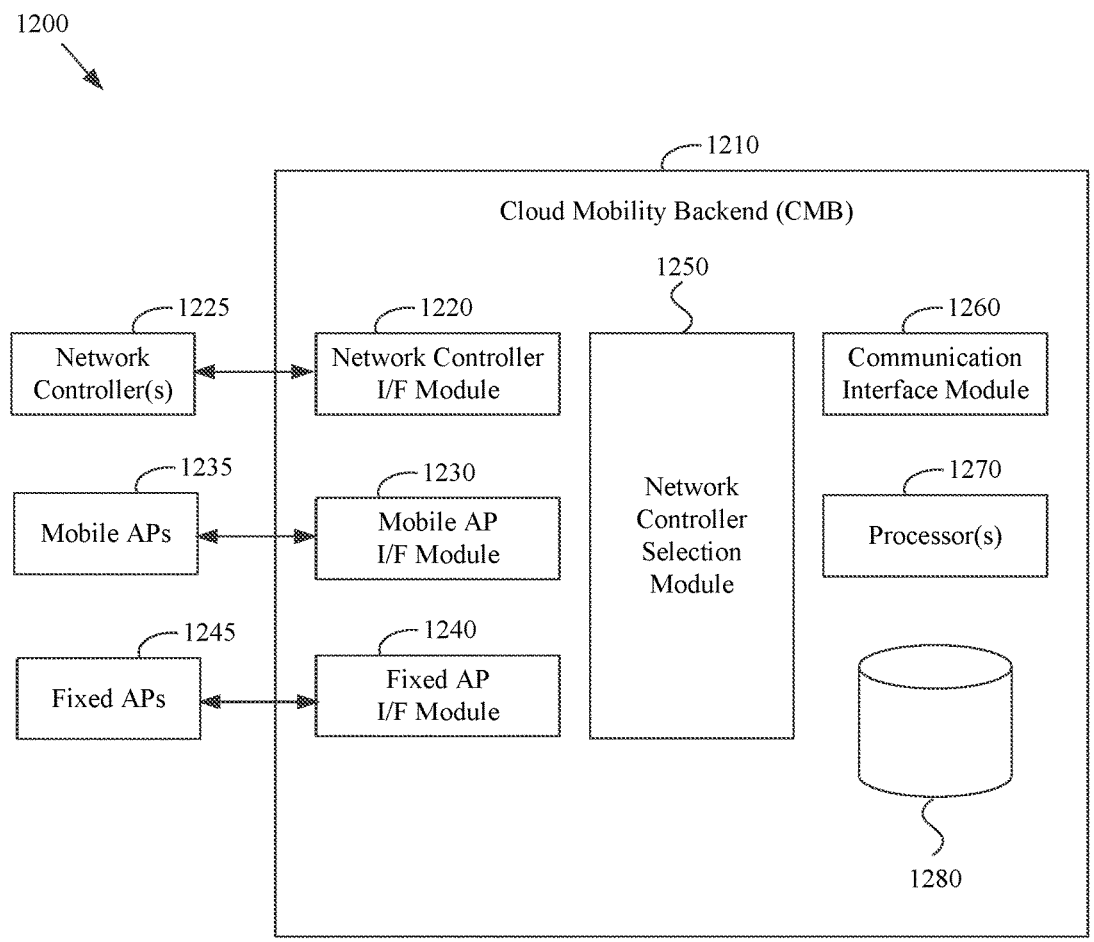
FIG. 12 shows a block diagram of various components of an example cloud mobility backend, in accordance with various aspects of the present disclosure.

FIG. 12 shows a block diagram of various components of an example cloud mobility backend (CMB), in accordance with various aspects of the present disclosure. The example node 1200 may, for example, share any or all characteristics with the other example methods, nodes, networks, and/or network components 100-1100, discussed herein. For example, any or all of the components of the example CMB 1200 may perform any or all of the method steps presented herein.

The example CMB 1200 may, for example, comprise a stand-alone network server, a networked computer, a portion of another server, a portion of a central network controller, a portion of a mobility controller, a portion of a Fixed or Mobile AP, etc.

The example CMB 1200 comprises a communication interface module 1260 that operates to perform any or all of the wireless and/or wired communication functionality for the CMB 1200, many examples of which are provided herein (e.g., communication with NCs, communication with Fixed AP nodes, communication with Mobile AP nodes, communication directly with client devices, backhaul communication, etc.). The communication I/F module 1260 may, for example, operate in accordance with any of a variety of cellular communication protocols, wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), etc. For example, any of the example communication discussed herein between a CMB and an NC, between a CMB and a Fixed or Mobile AP, etc., may be performed utilizing the communication interface module 1260.

The example CMB 1200 also comprises a Mobility Controller I/F Module 1220 that, for example, manages communication between the CMB 1200 and one or more Network Controllers 1225 (or Mobility Controllers). The Network Controller (or Mobility Controller) I/F Module 1220 may, for example, utilize communication services provided by the Communication Interface Module 1260 to perform various aspects of such communication.

The example CMB 1200 also comprises a Mobile AP I/F Module 1230 that, for example, manages communication between the CMB 1200 and one or more Mobile APs 1235. The Mobile AP I/F Module 1230 may, for example, utilize communication services provided by the Communication Interface Module 1260 to perform various aspects of such communication.

The example CMB 1200 also comprises a Fixed AP I/F Module 1240 that, for example, manages communication between the CMB 1200 and one or more Fixed APs 1245. The Mobile AP I/F Module 1240 may, for example, utilize communication services provided by the Communication Interface Module 1260 to perform various aspects of such communication.

The example CMB 1200 also comprises a Network Controller Selection Module 1250. The Network Controller Selection Module 1250 may, for example, operate to perform any or all of the NC selection functionality discussed herein.

The example CMB 1200 may also comprise one or more processors 1270 and memory devices 1280. The processor(s) 1270 may, for example, comprise any of a variety of processor characteristics. For example, the processor(s) 1270 may comprise one or more of a general purposes processor, RIS processor, microcontroller, ASIC, DSP, video processor, etc.). The memory device(s) 1280 may, for example comprise any of a variety of memory characteristics. For example, the memory device(s) 1280 may comprise a volatile memory, non-volatile memory, etc. The memory device(s) 1280 may, for example, comprise a non-transitory computer-readable medium that comprises software instructions that when executed by the processor(s) 1270, cause the CMB 1200 to perform any or all of the functionality discussed herein (e.g., with regard to the example methods discussed herein, etc.).

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide systems and methods for managing network controllers (or mobile controllers) and their network interactions in a network of moving things. As non-limiting examples, various aspects of this disclosure provide systems and methods for assigning and/or adapting the assignment of network controllers to mobile access points (e.g., of autonomous vehicles, manually locally controlled vehicles, remotely controlled vehicles, etc.). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A vehicle communication network node comprising:
   at least one module operable to, at least:
      receive a message from a second node of the vehicle communication network;
      identify, based at least in part on contents of the message, a Network Controller (NC) of the vehicle communication network to assign to a Mobile Access Point (MAP) of the vehicle communication network; and
      notify at least the identified NC of the assignment of the identified NC to the MAP,
   wherein the at least one module is operable to identify the NC based, at least in part, on a respective target level of service to be provided by the identified NC and at least one other NC.

2. The vehicle communication network node of claim 1, wherein the at least one module is operable to notify at least a second NC of the assignment of the identified NC to the MAP.

3. The vehicle communication network node of claim 1, wherein the at least one module is implemented in a Cloud Mobility Backend (CMB) node of the vehicle communication network.

4. The vehicle communication network of claim 1, wherein the second node comprises the MAP to which the identified NC is assigned.

5. The vehicle communication network of claim 1, wherein the at least one module is operable to determine, based at least in part on the contents of the message, to reassign a second MAP from the identified NC to a second NC, and notify the identified NC and/or the second NC of the reassignment of the second MAP to the second NC.

6. The vehicle communication network node of claim 1, wherein the contents of the message comprise information identifying a location of the MAP, and the at least one module is operable to identify the NC to assign to the MAP based at least in part on the identified location of the MAP.

7. The vehicle communication network node of claim 1, wherein the contents of the message comprise information identifying a travel route of the MAP, and the at least one module is operable to identify the NC to assign to the MAP based at least in part on the identified travel route of the MAP.

8. The vehicle communication network node of claim 1, wherein the contents of the message comprise information identifying characteristics of a vehicle associated with the MAP, and the at least one module is operable to identify the NC to assign to the MAP based at least in part on the identified characteristics of the vehicle associated with the MAP.

9. A vehicle communication network node comprising:
   at least one module operable to, at least:
      receive a message from a second node of the vehicle communication network;
      identify, based at least in part on contents of the message, a Network Controller (NC) of the vehicle communication network to assign to a Mobile Access Point (MAP) of the vehicle communication network; and
      notify at least the identified NC of the assignment of the identified NC to the MAP,
   wherein the contents of the message comprise information identifying a software version, and the at least one module is operable to identify the NC to assign to the MAP based at least in part on the identified software version.

10. A vehicle communication network node comprising:
    at least one module operable to, at least:
       receive a message from a second node of the vehicle communication network;
       identify, based at least in part on contents of the message, a Network Controller (NC) of the vehicle communication network to assign to a Mobile Access Point (MAP) of the vehicle communication network; and
       notify at least the identified NC of the assignment of the identified NC to the MAP,
    wherein the at least one module is operable to identify the NC to assign to the MAP based at least in part on historical information.

11. The vehicle communication network node of claim 10, wherein the historical information comprises historical communication traffic statistics.

12. A vehicle communication network node comprising:
    at least one module operable to, at least:
       receive a message from a second node of the vehicle communication network;
       identify, based at least in part on contents of the message, a Network Controller (NC) of the vehicle communication network to assign to a Mobile Access Point (MAP) of the vehicle communication network; and
       notify at least the identified NC of the assignment of the identified NC to the MAP,
    wherein the contents of the message comprise information identifying characteristics of a vehicle associated with the MAP, and the at least one module is operable to identify the NC to assign to the MAP based at least in part on the identified characteristics of the vehicle associated with the MAP, and
    wherein the at least one module is operable to identify the NC to assign to the MAP based at least in part on whether the vehicle associated with the MAP is an autonomous vehicle.

13. A vehicle communication network node comprising:
    at least one module operable to, at least:
       receive a message from a second node of the vehicle communication network;
       identify, based at least in part on contents of the message, a Network Controller (NC) of the vehicle communication network to assign to a Mobile Access Point (MAP) of the vehicle communication network; and notify at least the identified NC of the assignment of the identified NC to the MAP, wherein the contents of the message comprise information identifying characteristics of a vehicle associated with the MAP, and the at least one module is operable to identify the NC to assign to the MAP based at least in part on the identified characteristics of the vehicle associated with the MAP, and wherein the at least one module is operable to identify the NC to assign to the MAP based at least in part on an identity of a fleet of which the vehicle associated with the MAP is a member.

14. A vehicle communication network node comprising:
at least one module operable to, at least:
receive a message from a second node of the vehicle communication network;
identify, based at least in part on contents of the message, a Network Controller (NC) of the vehicle communication network to assign to a Mobile Access Point (MAP) of the vehicle communication network; and
notify at least the identified NC of the assignment of the identified NC to the MAP,
wherein the contents of the message comprise information identifying a present performance level of a second NC, and the at least one module is operable to identify the NC to assign to the MAP based at least in part on the present performance level of the second NC.

15. The vehicle communication network node of claim 14, wherein the at least one module is operable to offload the MAP from the second NC to the identified NC based at least in part on the present performance level of the second NC.

16. A vehicle communication network node comprising:
at least one module operable to, at least:
receive message from a Mobile Access Point (MAP) of the vehicle communication network;
identify, based at least in part on contents of the message, a Network Controller (NC) of the vehicle communication network to assign to the MAP; and
notify the identified NC of the assignment of the NC to the MAP,
wherein the contents of the message comprise information identifying a software version of the MAP, and the at least one module is operable to identify the NC to assign to the MAP based at least in part on the identified software version of the MAP.

17. The vehicle communication network node of claim 16, wherein the contents of the message comprise a request from the MAP for an assignment of a Network Controller to the MAP.

18. The vehicle communication network node of claim 16, wherein the contents of the message comprise information identifying a location of the MAP, and the at least one module is operable to identify the NC to assign to the MAP based at least in part on the identified location of the MAP.

19. The vehicle communication network node of claim 16, wherein the contents of the message comprise information identifying communication needs of the MAP, and the at least one module is operable to identify the NC to assign to the MAP based at least in part on the communication needs of the MAP.

20. A vehicle communication network node comprising:
at least one module operable to, at least:
receive message from a Mobile Access Point (MAP) of the vehicle communication network;
identify, based at least in part on contents of the message, a Network Controller (NC) of the vehicle communication network to assign to the MAP; and
notify the identified NC of the assignment of the NC to the MAP,
wherein the contents of the message comprise information identifying communication needs of the MAP, and the at least one module is operable to identify the NC to assign to the MAP based at least in part on the communication needs of the MAP, and
wherein the information identifying communication needs of the MAP comprises information identifying a type of information communicated by the MAP, and the at least one module is operable to identify the NC to assign to the MAP based at least in part on the identified type of information.

21. A vehicle communication network node comprising:
at least one module operable to, at least:
receive message from a Mobile Access Point (MAP) of the vehicle communication network;
identify, based at least in part on contents of the message, a Network Controller (NC) of the vehicle communication network to assign to the MAP; and
notify the identified NC of the assignment of the NC to the MAP,
wherein the contents of the message comprise information identifying communication needs of the MAP, and the at least one module is operable to identify the NC to assign to the MAP based at least in part on the communication needs of the MAP, and
wherein the information identifying communication needs of the MAP comprises information identifying information delivery requirements of the MAP, and the at least one module is operable to identify the NC to assign to the MAP based at least in part on the identified information delivery requirements.

* * * * *